March 4, 1969  H. J. VANSTROM  3,430,809
METERED PARTS DISPENSING CARTRIDGE
Filed July 13, 1967
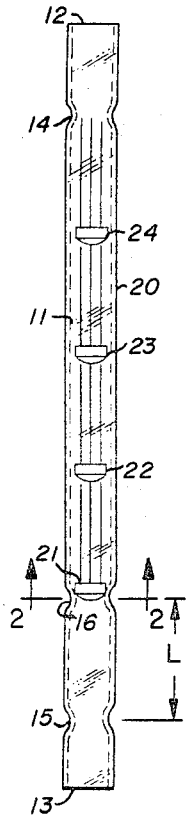
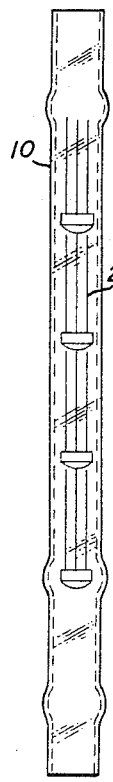
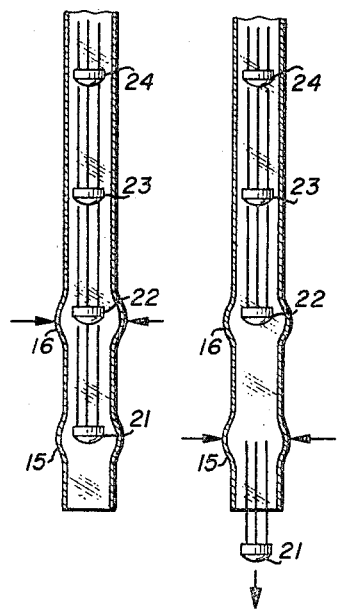
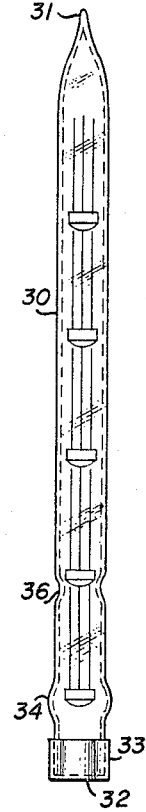
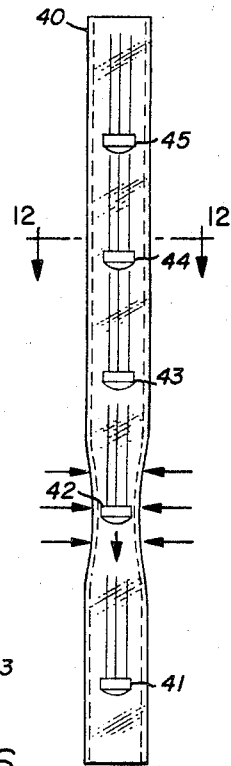
Fig_1  Fig_3  Fig_4  Fig_5  Fig_6
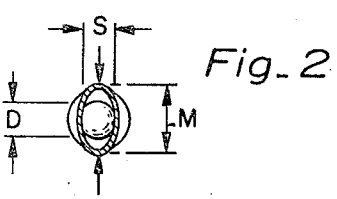
Fig_11
Fig_12
  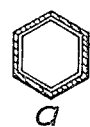 
a      a      a      a
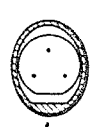  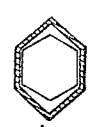 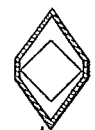
b      b      b      b
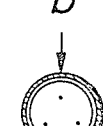 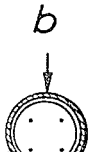 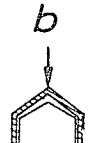 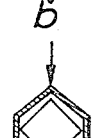
c      c      c      c
Fig_7  Fig_8  Fig_9  Fig_10
Fig_2
INVENTOR
HAROLD J. VANSTROM
BY
ATTORNEY

United States Patent Office 3,430,809
Patented Mar. 4, 1969

3,430,809
METERED PARTS DISPENSING CARTRIDGE
Harold J. Vanstrom, 210 Easy St.,
Mountain View, Calif. 94040
Filed July 13, 1967, Ser. No. 653,052
U.S. Cl. 221—64                             5 Claims
Int. Cl. B65d 83/00; A47f 1/04; G07f 11/00

ABSTRACT OF THE DISCLOSURE

A tubular receptacle for carrying and dispensing small articles with resilient constrictive portions which normally retain articles within the receptacle but which may be deformed to permit passage and dispensing of the articles in measured amounts.

BACKGROUND OF THE INVENTION

Field of the invention

This invention relates to a novel metered dispensing tube providing a convenient means for shipping, storage and handling of small articles and from which the articles may be dispensed singly or in prescribed numbers.

Description of the prior art

With the advent of miniaturization and microminiaturization of many articles, for example electronic components, the miniature components have become increasingly difficult to store, handle and dispense without damage thereto. There is thus a need for a means by which tiny articles may be readily handled. There is further need to provide a dispensing means by which miniature components can be dispensed singly or on predetermined numerical groups and in a predetermined orientation.

Characteristically, miniature electronic components come in a variety of configurations but small resistors, condensers, transistors, and the like, with their attached electrical leads occupy a generally elongated cylindrical volume. It is also common practice to provide a discontinuity, such as a flat surface or projection, on a basically uniform geometry for the purpose of indexing the article and to facilitate identification of the electrical leads thereto.

As use and production of electronic components has increased, the unit cost has decreased, and competition for available markets has become more intense. It is thus essential that any packaging or handling means employed be inexpensive as well as providing requisite physical protection for the articles carried therein. Dispensing containers presently available are generally complex on construction or manipulation and are not suitable for dispensing the elongated configurations represented by most electronic components. Further, there is generally no provision by existing dispensers for maintaining particular orientation or indexed relationship of articles dispensed therefrom.

SUMMARY OF THE INVENTION

The novel metered dispensing tube of the instant invention is of simple unitary construction with no moving parts and lends itself to automated as well as manual parts handling methods employed in industry. The subject invention thus provides an inexpensive means for storage and handling of small relatively fragile articles without damage thereto. Further, the articles may be dispensed from the metered dispensing tube singly or in predetermined numbers at a most advantageous orientation and indexed relationship.

During the production of transistors, for example, it is common practice to manually inspect and test each unit for conformity to established standards. Typical steps include retrieval of each transistor from a disoriented lot in a bin or pile and manually positioning and orienting each unit before attaching test apparatus to the electrical leads thereof. In each instance, the transistor must be positioned for testing by orientation of the electrical leads and indexing according to the identifying discontinuity, flat or projection, provided for that purpose. A semi-skilled operator, to whom such testing is entrusted, may test up to approximately 800 transistors per hour. Use of the metered dispensing tube, in accordance with the present invention, is expected to permit testing of approximately 2000 transistors per hour by the same semi-skilled operator, by eliminating the search, identification, retrieval, reorientation and positioning of each individual unit.

It is consequently the objective of this invention to provide a novel metered dispensing tube having an elongated receptacle wherein articles are carried and from which the articles may be dispensed singly or in predetermined numbers at an oriented and indexed relationship most advantageous to their use.

Another objective of this invention is to provide an inexpensive storage, handling and dispensing device suitable for use in production and testing of small articles, such as electronic components, their packaging for distribution and sale and for the convenient use by consumers of such articles carried therein.

A further objective of this invention is to provide a storage and handling container wherein the articles carried therein are readily identifiable and the number therein readily ascertainable.

Still another objective of this invention is to provide a shipping, storage, handling and dispensing means which is readily adaptable to a variety of cross-sectional shapes and sizes exhibited by small components or articles to which this invention is readily applicable.

Objects and advantages other than those set forth above will be apparent from the following description when read in connection with the accompanying drawings, in which:

BRIEF DESCRIPTION OF THE DRAWINGS

FIGURE 1 is an elevational view of a metered dispensing tube constructed in accordance with this invention;

FIGURE 2 is a view taken along lines 2—2 of FIGURE 1 and illustrates the configuration of the constriction in its normal position;

FIGURE 3 is a side view of the metered dispensing tube of FIGURE 1 in normal position;

FIGURES 4 and 5 are partial vertical sectional views of the metered dispensing tube illustrating sequential operational steps in the dispensing of articles therefrom;

FIGURE 6 is an elevational view of another embodiment of a metered dispensing tube arranged as a package and dispenser employed for distribution and sale of the articles carried therein.

FIGURES 7, 8, 9 and 10 are horizontal sectional views of metered dispensing tubes illustrating tubular interior space and constrictive configurations employed to accommodate various cross-sectional geometries of articles carried therein;

FIGURE 11 is an elevation view of another embodiment of a metered dispensing tube in accordance with this invention; and FIGURE 12 is a view along lines 12—12 of FIGURE 11.

DESCRIPTION OF THE PREFERRED EMBODIMENT

Referring to FIGURE 1, the metered dispensing tube thereshown has a generally elongated body 10 defining a tubular interior space 11 of generally cylindrical form which is very much alike, in shape, to a plastic drinking straw of transparent or translucent material. Body 10 has a top opening 12 for loading and a bottom opening 13 for dispensing, and each opening provides an unobstructed passage of circular configuration. Interposed between the ends of body 10 are theree deformable constrictive portions; a loading constriction 14 located from top opening 12 a distance suitable to prevent articles carried therein from projecting beyond top opening 12, a dispensing constriction 15 located near bottom opening 13 and a metering constriction 16 located a distance L from the dispensing constriction 15. The distance L between metering constriction 16 and dispensing constriction 15 is commensurate with the length of articles and number of articles desired to be dispensed together.

The overall length of body 10 is generally selected in accordance with the desired number of articles to be carried and the length of each article. The articles, such as the illustrated electronic components, are collectively referred to by the reference numeral 20. The individual articles 21 through 24 of the group of articles 20 are identical. For example, the electronic transistors here illustrated are generally cylindrical in shape with three electrical leads extending therefrom. The diameter of tubular space 11, with the exception of the constrictions, is selected slightly greater than the nominal diameter D of the carried articles 20 so that the articles are free to move longitudinally between the constrictions 14, 15 and 16.

Constrictions 14, 15 and 16, as best seen in FIGURE 2, are generally of oval or elliptical cross-sectional configuration and define a major axis M and a minor axis S. Minor axis S is selected to be smaller than diameter D of articles 20 to form a constricting portion through which articles 20 cannot freely pass, and major axis M is selected to be sufficiently large so that, upon deformation of the constriction, its cross-sectional configuration can be altered to generally conform to the cross-sectional configuration of articles 20. As illustrated in FIGURES 1 and 2, the major and minor axes of constrictions 14, 15 and 16 are in parallel alignment along body 10 so that deforming forces are applied along the same lateral direction.

FIGURES 4 and 5 illustrate the sequential operational steps in dispensing articles carried in the metered dispensing tube. In FIGURE 4, localized forces applied laterally, as by squeezing between the thumb and forefinger, across the major axis M of the metering constriction 16, in the direction of the headed arrows, will deform the normally oval-shaped configuration of metering constriction 16 to a substantially circular configuration which is sufficient in cross-sectional area to permit unobstructed passage of article 21 therethrough. Article 21 followed by articles 22, 23 and 24 drop by gravity until article 21 is obstructed by dispensing constriction 15. Removal or decrease of the localized lateral forces at metering constriction 16 will permit the constriction to return to its normally oval-shaped cross-sectional configuration, thereby obstructing the further passage of articles.

In FIGURE 5, localized lateral forces applied across the major axis of dispensing constriction 15, in the direction of the headed arrows, will deform the normally oval-shaped cross-sectional configuration of dispensing constriction 15 to a substantially circular cross-sectional configuration which is sufficient in cross-sectional area to permit unobstructed passage of the article 21 therethrough. The remaining articles in body 10 can, of course, be singly and sequentially dispensed by merely repeating the above-described steps until body 10 is depleted of its supply of articles.

As is readily understood, the major and minor axes of deformable constrictions 15 and 16 may be crossed for increased assurance that the application of deforming forces to one constriction will not deform the other constriction. In other words, the direction of application of the deforming force of one constriction is ninety degrees disposed with respect to the direction of application of the deforming force for the other constriction.

FIGURE 6 illustrates an alternate embodiment of a metered dispensing tube as may be employed for a combined merchandising and dispenser package for distribution and sale of the articles carried therein. This tube has a body 30 which is generally tubular, and constructed of a transparent and resilient plastic material through which the articles carried are readily visible. Visibility of the articles within the body enhance the sales appeal as a display device as well as providing a means for readily identifying the contents and number contained therein. The top opening 31 may be crimped and heat sealed after the articles are loaded, as illustrated, or may be provided with an appropriate closure member. The bottom opening 32 may be closed with a plug or cap 33 conforming to the cross-sectional configuration of the body 30 to prevent entry of dust or other contaminants.

Two constrictive portions are employed; a deformable dispensing constriction 34 located near the bottom opening 32, and a deformable metering constriction 35 located a distance therefrom sufficient to dispense the articles singly or in preselected numerical groups. Constrictions 34 and 35 may be alike in all respects to constructions 15 and 16, but are shown to have their major and minor axes oriented at ninety degrees to one another. As already mentioned, the relative ninety-degree misalignment of the constrictions prevents a carelessly applied lateral force from deforming both constrictions simultaneously. Further, should the spacing between the constrictions be so small that there is difficulty in deforming one without deforming the other, the ninety-degree misalignment of their major axes will assure that only one constriction is deformed at a time. A still further application of the misaligned major axes of adjacent constriction is that a reciprocating or continuous rotation of the dispensing tube between lateral force applying members will result in the dispensing of a single article for each one hundred eighty degrees of sequential rotational movement.

FIGURES 7, 8, 9 and 10 illustrate a variety of tubular and constrictive cross-sectional configurations which may be employed to maintain articles of various cross-sectional geometries in particular rotationally indexed relationships. FIGURE 7a illustrates the cross-section of an essentially cylindrical interior space with an internal flat longitudinal discontinuity to maintain a consistent rotational orientation of a basically cylindrical article having a flat provided thereon for indexing purposes. FIGURE 7b indicates the normal cross-sectional configuration of the constrictive portion of the tube illustrated in FIGURE 7a wherein the minor axis thereof obstructs passage of the articles carried therein, until, as in FIGURE 7c, localized forces are applied laterally across the major axis of the constriction, in the direction of the headed arrows, changing the normally oval-shaped cross-sectional configuration of the constriction to a substantially circular cross-sectional configuration sufficient to permit unobstructed passage of the article therethrough.

FIGURES 8a, 9a and 10a illustrate tubular cross-sections commensurate with maintaining particular rotational orientation of the geometric configurations indicated. FIGURE 8a illustrates a basically circular cross-section with a projection therefrom for indexing purposes. FIGURE 9a illustrates the accommodation of a hexagonal configuration, and FIGURE 10a that of a square cross-section. FIGURES 8b, 9b and 10b illustrate the cross-sectional configuration of the constrictive portions of a metered dispensing tube shown in the normal position obstructing passage of the appropriately shaped articles. FIGURES 8c, 9c and 10c illustrate the deformed condition of the constrictive portions when subjected to localized forces applied laterally across the major axes of the contrictions, in the direction of the headed arrows, which will alter the cross-sectional configurations of the constrictions, as shown, to permit unobstructed passage of the appropriately shaped articles therethrough.

In all the above-described metered dispensers, the body may or may not be flexible as long as the portion of the body defining the constriction is flexible.

FIGURE 11 illustrates a metered dispensing tube wherein the entire tubular body 40 is resilient and of a constrictive cross-sectional configuration, in this instance elliptical, as indicated in FIGURE 12. In this manner, and by selecting the minor axis to be somewhat less than the diameter of the carried articles 41, 42, 43, 44 and 45, the articles are constrained by an interference fit effected between the tubular body and the articles. By imposition of a steady or transistory lateral force, indicated by the headed arrows, across the major axis of the normally elliptical-shaped tubular body, a portion of the tubular body is deformed into an essentially circular cross-sectional configuration sufficiently large in diameter to allow one or more articles to freely slide longitudinally within tubular body 40. The article 42, or number of articles, may thus be freely moved, according to the longitudinal extent of the applied lateral forces and/or the movement of those forces longitudinally along the tubular body 40.

It should be recognized that forces other than gravity are anticipated for moving the articles within the tubular interior space and expelling them from the metered dispensing tube. For example, mechanical, pneumatic or magnetic techniques may be employed where the metered dispensing tube is used in other than a vertical orientation.

Whereas certain operative forms of the invention have been shown and described, it should be understood that this description should be taken in an illustrative or diagrammatic sense only. There are many variations and modifications which will be apparent to those skilled in the art which will not depart from the scope and spirit of the invention. I, therefore, do not wish to be limited to the precise details of construction set forth, but desire to avail myself of such variations and modifications as come within the scope of the appended claims.

What is claimed is:

1. A meter dispensing tube for carrying and measured dispensing identical and axially aligned articles, comprising:
   an elongated body open at at least one end and having a tubular interior space which generally conforms to the cross-sectional configuration of said articles;
   first and second spaced apart deformable constrictions integral with said body and having a normal cross-sectional configuration for obstructing passage of said articles along said interior space, said first constriction being located near said open end; and
   said constrictions being independently and separately deformable, by localized forces applied laterally to said body at said constrictions, to conform the cross-sectional configuration of said constrictions to allow the unobstructed passage of said articles thereacross.

2. A metered dispensing tube in accordance with claim 1 in which said first and second constrictions are spaced apart a distance which is substantially equal to $n$ times the axial length of one of said articles, where $n$ is an integer.

3. A metered dispensing tube in accordance with claim 2 wherein the cross-sectional configurations of said first and second deformable constrictions are oriented with respect to one another in such a manner that the localized lateral force for deforming one of said constrictions to allow the unobstructed passage of said articles thereacross differs angularly from the localized lateral force for deforming the other of said constrictions to allow the unobstructed passage of articles thereacross.

4. A metered dispensing tube in accordance with claim 1 in which said tube has a further open end in which is included a third deformable constriction, substantially identical to said other constrictions, located near said further open end whereby said tube may be loaded with articles through said further open end.

5. A meter dispensing tube for carrying and measured dispensing of identical and axially aligned articles, comprising:
   a resilient body open at at least one end and having a tubular interior space with a cross-sectional configuration normally providing an interference fit with the articles for holding the articles in place along said interior space; and
   said cross-sectional configuration being deformable, by application of localized lateral forces to said body, to conform the cross-sectional configuration generally to the cross-sectional configuration of said articles to thereby free the articles to allow their unobstructed passage along said interior space.

References Cited

UNITED STATES PATENTS

| | | | |
|---|---|---|---|
| 2,673,011 | 3/1954 | Rood et al. | 222—450 XR |
| 2,960,259 | 11/1960 | Aveni | 221—64 XR |
| 3,206,067 | 9/1965 | Smith et al. | 221—281 |

FOREIGN PATENTS

| | | |
|---|---|---|
| 177,277 | 1/1954 | Austria. |

OTHER REFERENCES

German patent application DAS 1,107,407, May 1961, Kuhbald.

WALTER SOBIN, *Primary Examiner.*

U.S. Cl. X.R.

221—155, 281, 289; 222—450